Nov. 28, 1967  R. M. MULLER  3,355,234

FOUR COMPONENT MICROSCOPE OBJECTIVE

Filed May 18, 1964

INVENTOR.
ROBERT M. MULLER

BY
Bean, Brooks, Buckley & Bean
ATTORNEYS

United States Patent Office 3,355,234
Patented Nov. 28, 1967

3,355,234
FOUR COMPONENT MICROSCOPE OBJECTIVE
Robert M. Muller, Cheektowaga, N.Y., assignor to American Optical Company, Southbridge, Mass.
Filed May 18, 1964, Ser. No. 368,266
3 Claims. (Cl. 350—176)

ABSTRACT OF THE DISCLOSURE

A front lens of large thickness, plano front surface and aplanatic rear surface provides coma correction for a rear doublet. The coma in the rear doublet arises due to shaping the doublet to maximize overcorrection of spherical aberration. These two lenses, forming a microscope objective, have residual overcorrection of axial color and another axial aberration which may be coma, spherical aberration or a combination of spherical aberration and coma which are cancelled by a rearwardly spaced telescope objective so that the telescope objective—microscope objective combination provides a flat field free of lateral color.

---

This invention relates to optical systems for microscopes and pertains, more particularly, to an improved microscope objective.

In Patent No. 3,132,200 dated May 5, 1964, improved optical systems are disclosed in which a single telescope objective is used in combination with any one of a series of microscope objectives having different powers and/or different optical characteristics such as numerical aperture. The disclosed systems permit the eyepiece and telescope objective to remain fixed while the nosepiece carrying the microscope objective is moved for focusing purposes, thus allowing various advantages of a mechanical nature to be gained. Additionally, the systems of the above patent provide improved optical characteristics particularly with respect to the field aberrations of lateral color and field curvature. The present invention is concerned with provision of economical microscope objectives which may be incorporated within systems such as the aforesaid systems. In particular, this invention is directed to a microscope objective having a numerical aperture of at least about 0.5 and a power of at least about 20X; in which such microscope objective employs only three lens elements, a front lens followed by a cemented doublet, for use in conjunction with a telescope objective which itself is usable with a great many other microscope objectives. Specifically, the microscope objectives herein described in detail are used in combination with the telescope objective disclosed in copending application Ser. No. 343,829 filed Feb. 10, 1964, although it is to be understood that the principles of this invention are not limited to this particular telescope objective.

The primary object of this invention, then, is to achieve an economical construction of a microscope objective of medium power and commensurate N.A. used in systems as aforesaid.

More particularly, it is an object of this invention to provide a three element microscope objective in which economy is realized not only by the small number of lens elements but also by the avoidance of extreme radii of the lens surfaces.

More specifically, it is an object of this invention to utilize a microscope objective, as aforesaid, which consists of the combination of a front lens and a doublet in which spherical aberration introduced by the front lens is corrected by employing a doublet having a shape substantially maximizing overcorrection for spherical aberration. The resultant coma thus introduced by the doublet is in turn corrected by making the front lens of substantial thickness. This basic combination also inherently permits other beneficial optical relationships to obtain.

Figure 1:
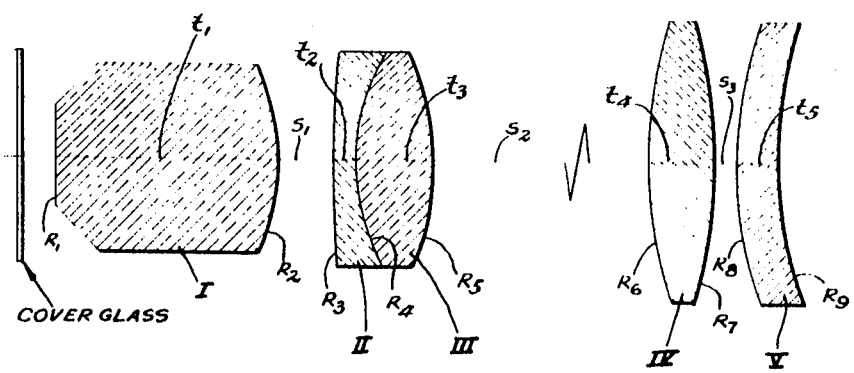
Figure 2:
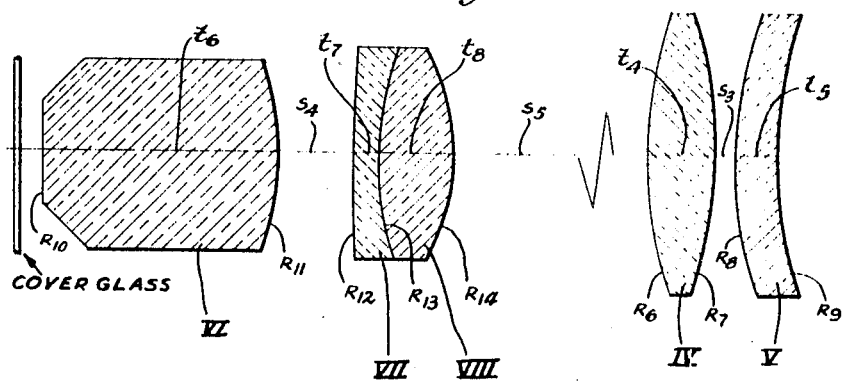

Other objects and advantages of the invention will appear from the description hereinbelow and the accompanying drawing wherein:

FIG. 1 illustrates a lens system according to one embodiment of this invention; and FIG. 2 illustrates another embodiment of the invention.

FIG. 1 illustrates a preferred embodiment of the invention comprising a collimating microscope objective I, II, III intended to work at N.A. 0.50 and in combination with the telescope objective IV, V having a magnification of about 20X; the lenses having the following optical characteristics in which $N_D$ is the index of refraction for the D line of sodium, $v$ is the reciprocal dispersion of the optical material and all radii, thicknesses and spacings are in millimeters:

| Lens | $N_D$ | $v$ | Radii | Thicknesses and Spacing |
|---|---|---|---|---|
| I | 1.7445 | 45.82 | $R_1 = \infty$<br>$R_2 = -8.389$ | $t_1 = 10.749$<br>$S_1 = 2.146$ |
| II | 1.78446 | 25.7 | $R_3 = +45.194$<br>$R_4 = +9.886$ | $t_2 = 1.50$ |
| III | 1.620 | 60.3 | $R_5 = -17.750$ | $t_3 = 3.360$<br>$S_2 = 98.771$ |
| IV | 1.617 | 54.9 | $R_6 = +105.825$<br>$R_7 = -161.032$ | $t_4 = 2.30$<br>$S_3 = 0.25$ |
| V | 1.511 | 63.5 | $R_8 = +46.939$<br>$R_9 = +32.800$ | $t_5 = 2.30$ |

The telescope objective IV, V is identical with that disclosed in copending application Ser. No. 343,829 filed Feb. 10, 1964, and is characterized by deliberately introduced undercorrected axial color and outward coma, with substantially zero spherical aberration, in order to permit the numerous microscope objectives disclosed in such application to display, in combination therewith, a substantially flat field in the substantial absence of astigmatism as well as substantial freedom from lateral color, in addition to the requisite states of correction for coma, spherical aberration and axial color. The above microscope objective I, II, III is characterized by the deliberate introduction of axial color and coma substantially equal, and of opposite sign to that introduced in the telescope objective IV, V. In this way, these axial aberrations tend to cancel out in the two objectives. At the same time, the construction of the microscope objective, even though it employs only three elements, results in a reasonably flat tangential image plane and in which spherical aberration, astigmatism and lateral color of the combination are well within the conventional tolerances therefor. Thus, a microscope objective results that renders good optical performance in combination with a standard telescope objective constructed so as to yield excellent optical performance with a great many other microscope objectives.

The microscope objective I, II, III employs an unusual front lens and, in this respect, it has been found that for the purposes of this invention, the thickness of the front lens I must be at least as great as the equivalent focal length of the microscope objective (9.136 mm. in the specific example) and is preferably somewhat greater. In addition, the working distance should be small and the rear surface (of radius $R_2$) of the front lens must work substantially aplanatically. The first surface of the front lens is substantially plano and for reasons of economy, it is preferred that it be exactly so. Because of the thickness of the front, the rear doublet II, III is relatively closely spaced from the second surface of the front lens I, it being understood that sufficient spacing should be established in order to allow for conventional adjustment thereof during assembly to correct for spherical aberration variation which may occur due to manufacturing tolerances. In addition to the substantially plano first surface, it great thickness and substantially aplanatic rear surface, the front lens must be of high index of refraction for sodium D light combined with a relatively high reciprocal dispersion.

Insofar as the doublet is concerned, it is necessary that when "bent" to or substantially to that shape which produces a maximum of overcorrected spherical aberration the doublet attains just that amount of overcorrected spherical aberration to substantially cancel the undercorrection of spherical aberration inherent in the front lens.

Thus, the essence of the invention involves a microscope objective-telescope objective combination in which the telescope objective is characterized by deliberately introduced axial color and one other axial aberration which may be coma, spherical aberration, or a combination of coma and spherical aberration; in which the aforesaid axial aberrations are substantially cancelled in the combination by a microscope objective utilizing only a single front lens followed by a cemented doublet; and in which the above characteristics of the microscope objective are made possible by (a) constructing the front lens with a substantially plano front surface, a thickness at least as great as the equivalent focal length of the microscope objective and with a rear surface working substantially aplanatically, and by (b) constructing the doublet so that it is capable of attaining just sufficient overcorrected spherical aberration, when "bent" to that shape which maximizes or substantially maximizes this aberration, to substantially cancel the undercorrected spherical aberration inherent in the front lens. In order to achieve the above relationships between the front lens and the doublet, the front lens is preferably constructed of a material having a high index of refraction for sodium D light and a relatively high reciprocal dispersion. This factor permits the doublet to attain the requisite characteristics without imposing requirements of indices of refraction and reciprocal dispersions on the doublet which are not readily available in commercial optical materials. To this end, it is preferred that the index of refraction, for sodium D light, of the front lens be greater than about 1.7 while having a reciprocal dispersion greater than about 40.

Thus, the front lens requires a substantially plano front surface, a rear surface working substantially aplanatically, a high index of refraction and a high reciprocal dispersion; the doublet requires a shape substantially maximizing overcorrection for spherical aberration and must be constructed of materials permitting such maximum to be just great enough to substantially cancel the undercorrection for spherical aberration of the front lens while introducing sufficient overcorrected axial color to cancel the undercorrected axial color of the front lens plus the relatively small amount of this aberration present in the telescope objective; and the front lens must be of sufficient thickness to substantially cancel the positive coma introduced by the shaped doublet and the positive coma which is present in the telescope objective.

A further example of this invention is illustrated in FIG. 2 wherein the telescope objective IV, V is identical with that previously disclosed, the following optical characteristics having the same meaning as in the previous table and relating to the microscope objective VI, VII, VIII having an equivalent focal length of 9.14 mm.:

| Lens | $N_D$ | $v$ | Radii | Thicknesses and Spacing |
|---|---|---|---|---|
| VI | 1.8804 | 41.1 | $R_{10}=\infty$<br>$R_{11}=-9.53$ | $t_6=11.36$<br>$S_4=2.77$ |
| VII | 1.78446 | 25.7 | $R_{12}=+57.56$<br>$R_{13}=+10.43$ | $t_7=1.50$<br>$t_8=3.36$ |
| VIII | 1.620 | 60.3 | $R_{14}=-16.74$ | $S_5=97.67$ |

As can be seen from the above example of FIG. 2, compared to the example of FIG. 1, the glasses used for the doublet are the same in each case whereas, in the second example, the glass used for the front lens is of greater index of refraction while still retaining a relatively high reciprocal dispersion. The most significant effect of this difference in the front lens resides in less negative tangential curvature of field for the combination of microscope objective and telescope objective in the second case, the astigmatism being about the same in each case (although of opposite signs in the two cases).

In the telescope objective, the undercorrected axial color is deliberately introduced to minimize lateral color of the various combinations of microscope objectives with the one telescope objective (as disclosed in the above copending application) while each microscope objective is constructed to substantially completely cancel axial color for the combination. This is due to the relatively distant spacing of the telescope objective from each associated microscope objective, as explained in the above mentioned copending applications. For similar reasons, the outward coma of the telescope objective is deliberately introduced to effect flattening of the tangential image plane for each combination of microscope objective-telescope objective even though the outward coma is also cancelled for each combination. However, as is also explained in the copending applications, either spherical aberration in the absence of coma or the combination of spherical aberration and coma may be used in lieu of the outward coma for purposes of flattening the tangential image plane. The principles of the present invention are workable with these alternatives although it is preferred to use outward coma in the telescope objective for field flattening purposes inasmuch as decentration problems are minimized thereby.

It is to be understood that certain changes and modifications as illustrated and described may be made without departing from the spirit of the invention or the scope of the following claims.

I claim:
1. In an optical system for microscopes of the type comprising: a telescope objective characterized by deliberately introduced undercorrected axial color, positive coma, and substantially zero spherical aberration, said telescope objective consisting of a positive singlet and a negative meniscus spaced rearwardly of the positive singlet and concave to the rear, and a microscope objective optically aligned with said telescope objective, said microscope objective being inherently afflicted both with lateral color and with tangential curvature of field and being characterized both by deliberately introduced overcorrected axial color and by deliberately introduced negative coma, the axial aberrations deliberately introduced in the microscope objective being opposite in sign and substantially equal to the corresponding axial aberrations deliberately introduced in the telescope objective, said telescope objective being spaced rearwardly from said microscope objective by an amount sufficient to permit the deliberately introduced axial aberrations of the telescope objective to substantially cancel, for the telescope objective-microscope objective combination, the inherent lateral color and tangential curvature of field contributions of the microscope objective while also leaving the said combination well corrected for axial color, spherical aberration and coma, the improvement comprising:

said microscope objective consisting of three lenses, a single front lens and a cemented doublet, said front lens having a plano front surface and a rear surface working aplanatically, and being afflicted with undercorrected spherical aberration and undercorrected axial color, said doublet being shaped to maximize overcorrected spherical aberration thereof sufficient to cancel the undercorrected spherical aberration of both said front lens and said telescope objective, and having overcorrected axial color sufficient to cancel the undercorrected axial color of both said front lens and said telescope objective while being afflicted with positive coma, and said front lens being of a thickness to cancel the positive coma of both said doublet and said telescope objective.

2. In an optical system according to claim 1 wherein said front lens I and said rear doublet II, III are constructed according to the following in which $N_D$ is the refractive index for sodium D light, $v$ is the reciprocal dispersion of the optical material and all dimensions are in millimeters:

| Lens | $N_D$ | $v$ | Radii | Thicknesses and Spacing |
|---|---|---|---|---|
| I | 1.7415 | 45.82 | $R_1 = \infty$ <br> $R_2 = -8.389$ | $t_1 = 10.749$ <br> $S_1 = 2.146$ |
| II | 1.78446 | 25.7 | $R_3 = +45.194$ <br> $R_4 = +9.886$ | $t_2 = 1.50$ <br> $t_3 = 3.360$ <br> $S_2 = 98.771$ |
| III | 1.620 | 60.3 | $R_5 = -17.750$ | |

3. In an optical system according to claim 1 wherein said front lens VI and said rear doublet VII, VIII are constructed according to the following in which $N_D$ is the refractive index for sodium D light, $v$ is the reciprocal dispersion of the optical material and all dimensions are in millimeters:

| Lens | $N_D$ | $v$ | Radii | Thicknesses and Spacing |
|---|---|---|---|---|
| VI | 1.8804 | 41.1 | $R_{10} = \infty$ <br> $R_{11} = -9.53$ | $t_6 = 11.36$ <br> $S_4 = 2.77$ |
| VII | 1.78446 | 25.7 | $R_{12} = +57.56$ <br> $R_{13} = +10.43$ | $t_7 = 1.50$ <br> $t_8 = 3.36$ <br> $S_5 = 97.67$ |
| VIII | 1.620 | 60.3 | $R_{14} = -16.74$ | |

References Cited

FOREIGN PATENTS 910,291  11/62  Great Britain.

DAVID H. RUBIN, *Primary Examiner.*

JEWELL H. PEDERSEN, *Examiner.*

R. J. STERN, *Assistant Examiner.*